(12) United States Patent
Wang

(10) Patent No.: US 11,174,885 B2
(45) Date of Patent: Nov. 16, 2021

(54) EXPANSION SCREW STRUCTURE

(71) Applicants: Masterpiece Hardware Industrial Co., Ltd., Lukang Township, Changhua County (TW); I-Fang Wang, Lukang Township, Changhua County (TW)

(72) Inventor: I-Fang Wang, Lukang Township (TW)

(73) Assignees: Masterpiece Hardware Industrial Co., Ltd., Lukang Township (TW); I-Fang Wang, Lukang Township (TW)

( * ) Notice: Subject to any disclaimer, the term of this patent is extended or adjusted under 35 U.S.C. 154(b) by 187 days.

(21) Appl. No.: 16/535,141

(22) Filed: Aug. 8, 2019

(65) Prior Publication Data

US 2021/0040972 A1 Feb. 11, 2021

(51) Int. Cl.
*F16B 13/04* (2006.01)
*F16B 13/00* (2006.01)

(52) U.S. Cl.
CPC ............ *F16B 13/04* (2013.01); *F16B 13/002* (2013.01)

(58) Field of Classification Search
CPC ....... F16B 13/124; F16B 13/002; F16B 13/04
USPC ................................ 411/30, 80.1, 80.5, 80.6
See application file for complete search history.

(56) References Cited

U.S. PATENT DOCUMENTS

| | | | | | |
|---|---|---|---|---|---|
| 4,210,057 | A | * | 7/1980 | Goring | F16B 13/124 411/37 |
| 4,322,194 | A | * | 3/1982 | Einhorn | F16B 13/001 411/30 |
| 5,692,864 | A | * | 12/1997 | Powell | F16B 13/002 411/30 |
| 7,144,212 | B2 | * | 12/2006 | Kaye | F16B 13/002 411/30 |
| 7,762,751 | B2 | * | 7/2010 | Panasik | F16B 13/002 411/30 |
| 2005/0084360 | A1 | * | 4/2005 | Panasik | F16B 13/002 411/44 |
| 2006/0165506 | A1 | * | 7/2006 | Panasik | F16B 13/002 411/30 |

\* cited by examiner

*Primary Examiner* — Flemming Saether
(74) *Attorney, Agent, or Firm* — Alan D. Kamrath; Karin L. Williams; Mayer & Williams PC

(57) ABSTRACT

An expansion screw structure contains an anchor for mating with a screw. The anchor includes a first segment and a second segment which have a central axis, and a shank. The anchor further includes a head which has a slot. The shank includes a first threaded section, multiple cutouts, a decreasingly conical tip, a second threaded section, a slit, a first support foot, a second support foot. The slit has a first part, a second part, and a third part. The second part has a first raised portion, the second part has a second raised portion, and the third part has a connection section and a thin coupling strap. The thin coupling strap has a first thickness, the connection section has a second thickness, and the first thickness of the coupling strap is ⅓ of the second thickness of the connection section.

10 Claims, 13 Drawing Sheets

EXPANSION SCREW STRUCTURE

BACKGROUND OF THE INVENTION

Field of the Invention

The present invention relates to an expansion screw structure screwed on a gypsum board, and more particularly to an anchor that does not deform after screwing a screw into the anchor.

Description of the Prior Art

To nail an object onto a gypsum board of a wall, a conventional anchor is drilled into the wall, and a screw is screwed into the anchor so that the anchor is expanded to separate two support feet, thus fixing the object on the gypsum board.

Referring to FIG. 12, an anchor 40 of an expansion screw has a screwing segment 41, a threaded section 42 formed on an outer surface of the anchor 40, a first support foot 43, a second support foot 44, a slit 45 defined between the first support foot 43 and the second support foot 44, and a connection portion 46 formed on a distal end of the slit 45.

In operation, the anchor 40 is drilled into the gypsum board 60, a screw 50 is screwed into the anchor 40 to expand the first support foot 43 and the second support foot 44, such that the connection portion 46 is broken, and the first support foot 43 and the second support foot 44 are separated and expanded to fix on the gypsum board 60, as illustrated in FIG. 13.

However, the first support foot 43 and the second support foot 44 of the anchor 40 do not pass the gypsum board 60 by ways of the connection portion 46. An excessive twisting force between the first support foot 43 and the second support foot 44 of the anchor 40 is produced, so the first support foot 43 is separated from the second support foot 44 unexpectedly, the first support foot 43 and the second support foot 44 cannot drill the gypsum board 60, and the anchor 40 does not work. To overcome this problem, another anchor 40 is used to drill the gypsum board 60, wherein a part of a distal end of the slit 45 not passing through the gypsum board is prolonged so as to increase a length of the connection portion 46. In addition, when the screw 50 is screwed with the anchor 40, the connection portion 46 is not broken so that the first support foot 43 and the second support foot 44 cannot be expanded and cannot fix on the gypsum board 60.

The present invention has arisen to mitigate and/or obviate the afore-described disadvantages.

SUMMARY OF THE INVENTION

The primary objective of the present invention is to provide an expansion screw structure which when the anchor is drilled into the hollow gypsum board, the reverse twisting force is produced between the first support foot and the second support foot, the connection section is connected with the thin coupling strap in a total length so as to support the reverse twisting force; when the reverse twisting force spreads in a total length, the anchor is screwed into the hollow gypsum board, the first support foot does not separate from the second support foot; when the screw is screwed into the slot from the anchor, the shank expands to tear the front end of the thin coupling strap in a thickness and to tear the thin coupling strap and the connection section, thus separating the thin coupling strap from the connection section.

To obtain above-mentioned objectives, an expansion screw structure provided by the present invention contains an anchor for mating with a screw.

The anchor includes a first segment and a second segment opposite to the second segment, the first segment and the second segment have a central axis, and a shank extends from the first segment to the second segment. The anchor further includes a head formed on the shank and the first segment, and a diameter of the head is more than the shank, the head has a slot defined therein so as to accommodate a tool or the screw. The shank includes a first threaded section formed on an outer wall of the shank and extending from the first segment to the second segment, the first threaded section is in a positive thread type, and the shank includes multiple cutouts defined on the outer wall thereof adjacent to the second segment. The second segment of the shank has a decreasingly conical tip, and the decreasingly conical tip has a second threaded section formed on an outer wall thereof. The shank includes a slit formed thereon and communicating with the slot so that the shank has a first support foot and a second support foot separated from the first support foot by the slit, the slit extends from a top of the shank to a bottom of the shank, and the slit has a first part, a second part, and a third part. The first part is close to the first segment and passes through the central axis, the second part is connected with the first part and bends so that the second part has a first raised portion opposite to the first support foot, and the second part has a second raised portion opposite to the second support foot. The third part is connected with the second part and obliquely extends to the second support foot so that a length of the first support foot is not equal to the second support foot, the third part has a connection section arranged on a distal end thereof and configured to connect the first support foot and the second support foot, the third part has a thin coupling strap configured to connect the first support foot and the second support foot. The thin coupling strap has a first thickness, the connection section has a second thickness, and the first thickness of the coupling strap is ⅓ of the second thickness of the connection section, the first thickness is not more than 3 mm.

DETAILED DESCRIPTION OF THE PREFERRED EMBODIMENTS

Figure 1:
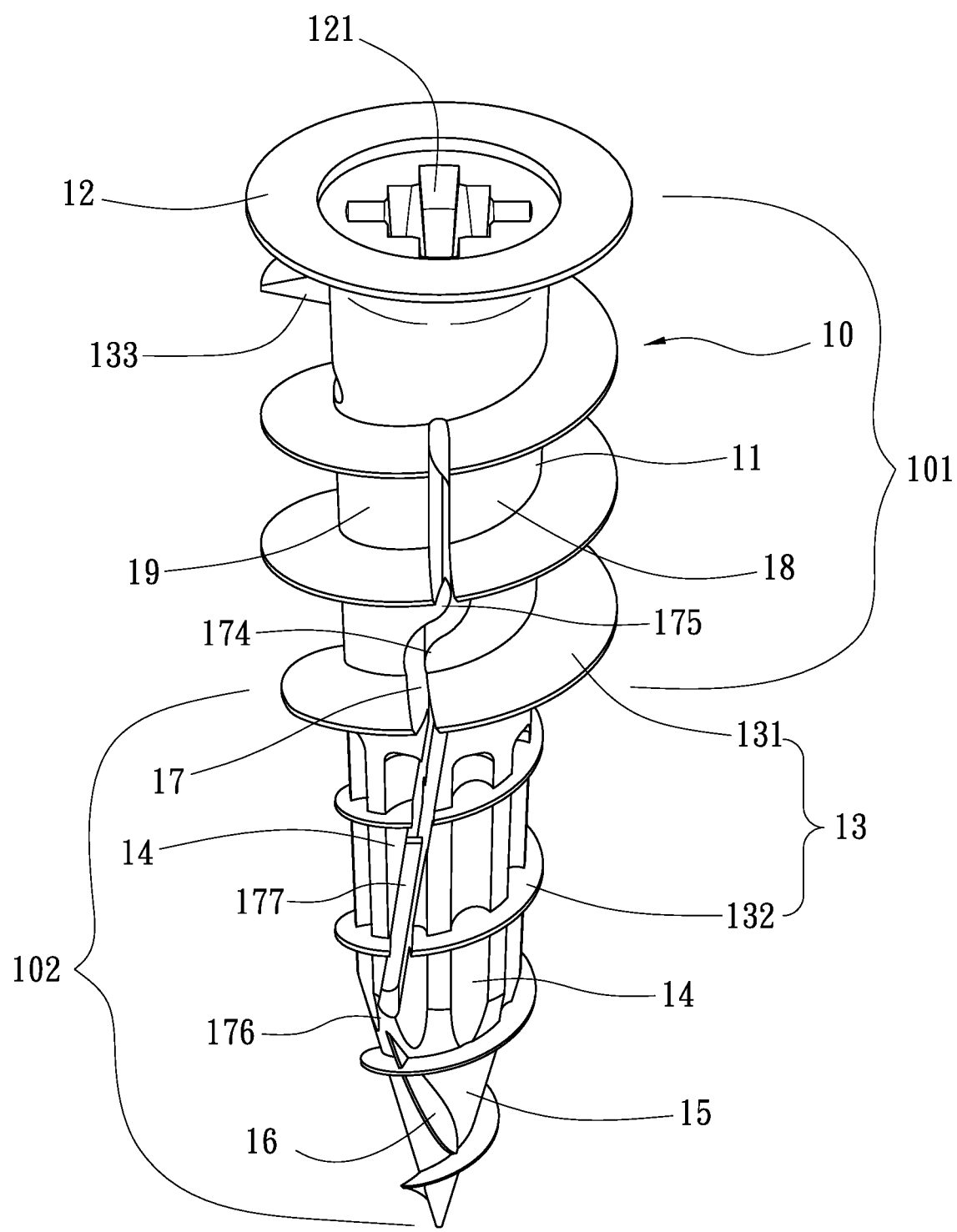
FIG. 1 is a perspective view showing the assembly of an expansion screw structure according to a preferred embodiment of the present invention.
Figure 2:
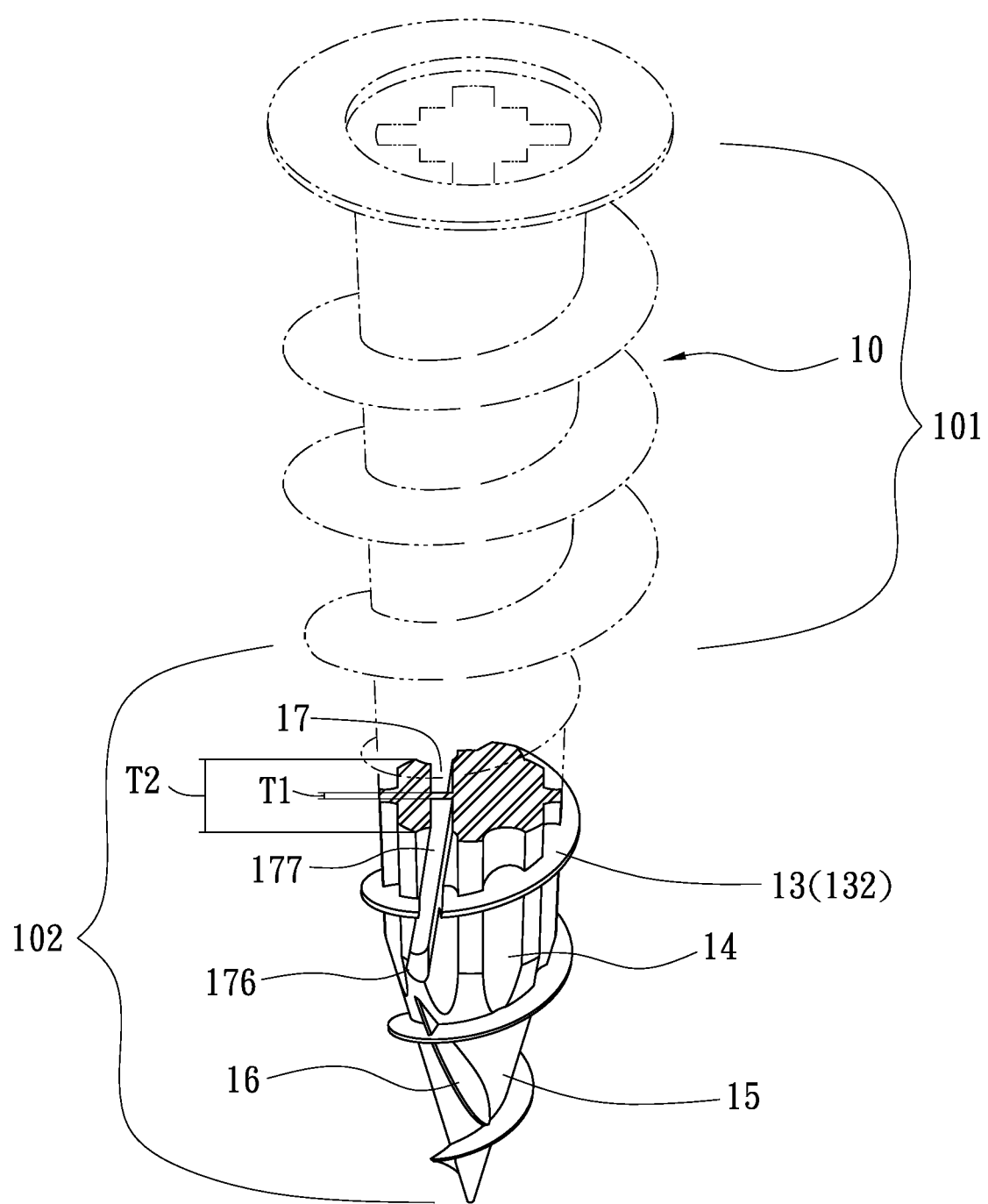
FIG. 2 is a cross-sectional perspective view showing the assembly of the expansion screw structure according to the preferred embodiment of the present invention.
Figure 3:
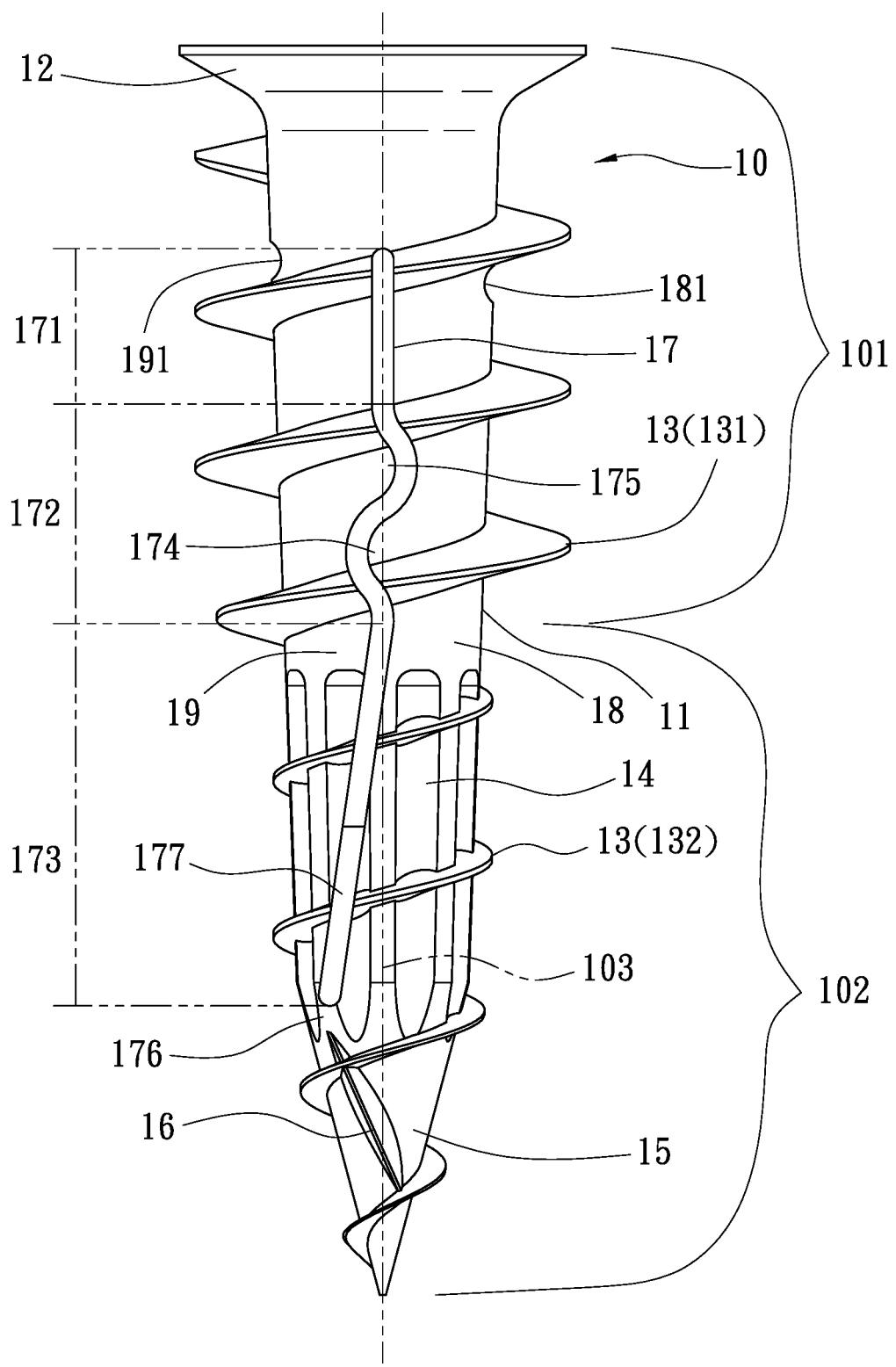
FIG. 3 is a front plan view showing the assembly of the expansion screw structure according to the preferred embodiment of the present invention.
Figure 4:
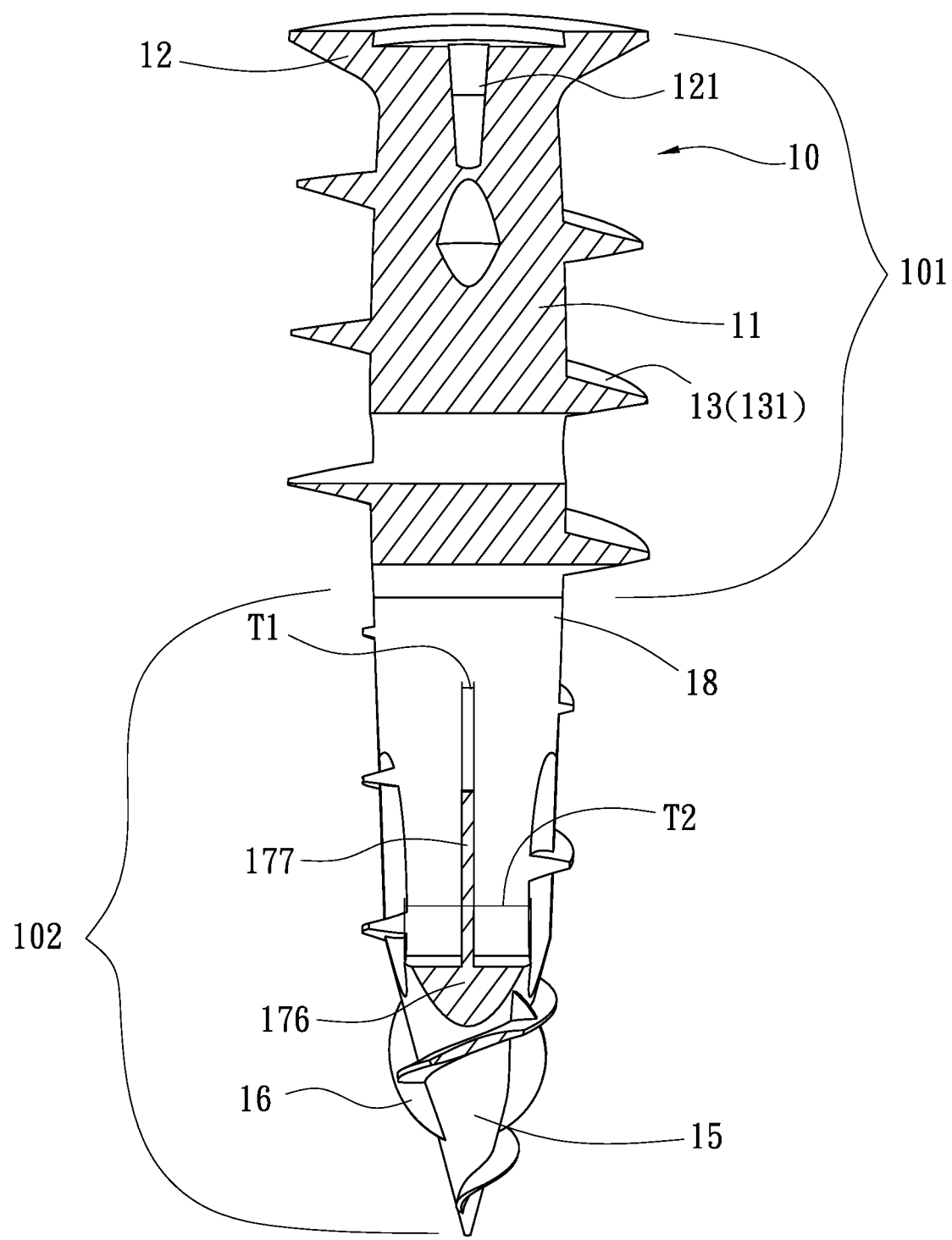
FIG. 4 is a cross-sectional view showing the assembly of the expansion screw structure according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-5 and 8, an expansion screw structure according to a preferred embodiment of the present invention includes an anchor 10 for mating with a screw 20.

The anchor 10 is integrally made of plastic or metal, and the anchor 10 includes a first segment 101 and a second segment 102 opposite to the first segment 101, the first segment 101 and the second segment 102 have a central axis 103, and a shank 11 extends from the first segment 101 to the second segment 102, wherein the first segment 101 is cylindrical, and the second segment 102 is tipped, the anchor 10 further includes a head 12 formed on the shank 11 and the first segment 101, and a diameter of the head 12 is more than the shank 11 and the first segment 101, a top surface of the head 12 has a slot 121 defined therein so as to accommodate a tool or the screw 20, wherein the slot 121 is formed in a cross shape or a double intersection cross shape, the shank 11 includes a first threaded section 13 formed on an outer wall of the shank 11 and extending from the first segment 101 to the second segment 102, and the first threaded section 13 is in a positive thread type, wherein the first threaded section 13 has multiple deep threads 131 adjacent to the first segment 101, and the first threaded section 13 has multiple shallow threads 132 proximate to the second segment 102, wherein a depth of the multiple deep threads 131 is more than the multiple shallow threads 132. The shank 11 includes multiple cutouts 14 defined on the outer wall thereof adjacent to the second segment 102, wherein the multiple cutouts 14 are located on a same zone as the multiple shallow threads 132. The second segment 102 has a decreasingly conical tip 15, the decreasingly conical tip 15 has a second threaded section 16 formed on an outer wall thereof, wherein the second threaded section 16 is in a reverse thread type and intersects with the multiple shallow threads 132 of the first threaded section 13, and the first threaded section 13 has an anti-rotation face 133 formed adjacent to the first segment 101.

The shank 11 includes a slit 17 formed thereon and communicating with the slot 121 so that the shank 11 has a first support foot 18 and a second support foot 19 separated from the first support foot 18 by the slit 17, the slit 17 extends from a top of the shank 11 to a bottom of the shank 11, and the slit 17 has a first part 171, a second part 172, and a third part 173, wherein the first part 171 is close to the first segment 101 and passes through the central axis 103, the second part 172 is connected with the first part 171 and bends so that the second part 172 has a first raised portion 174 opposite to the first support foot 18, and the second part 172 has a second raised portion 175 opposite to the second support foot 19. The third part 173 is connected with the second part 172 and obliquely extends to the second support foot 19 so that a length of the first support foot 18 is not equal to the second support foot 19. The third part 173 has a connection section 176 arranged on a distal end thereof and configured to connect the first support foot 18 and the second support foot 19. The third part 173 has a thin coupling strap 177 configured to connect the first support foot 18 and the second support foot 19, wherein the thin coupling strap 177 has a first thickness T1, the connection section 176 has a second thickness T2, and the first thickness T1 of the coupling strap 177 is ⅓ of the second thickness T2 of the connection section 176, the first thickness T1 is not more than 4 mm. The first support foot 18 has a first curved groove 181 formed on an outer wall thereof adjacent to the head 12, and the second support foot 18 has a second curved groove 191 formed on an outer wall thereof proximate to the head 12.

Figure 6:
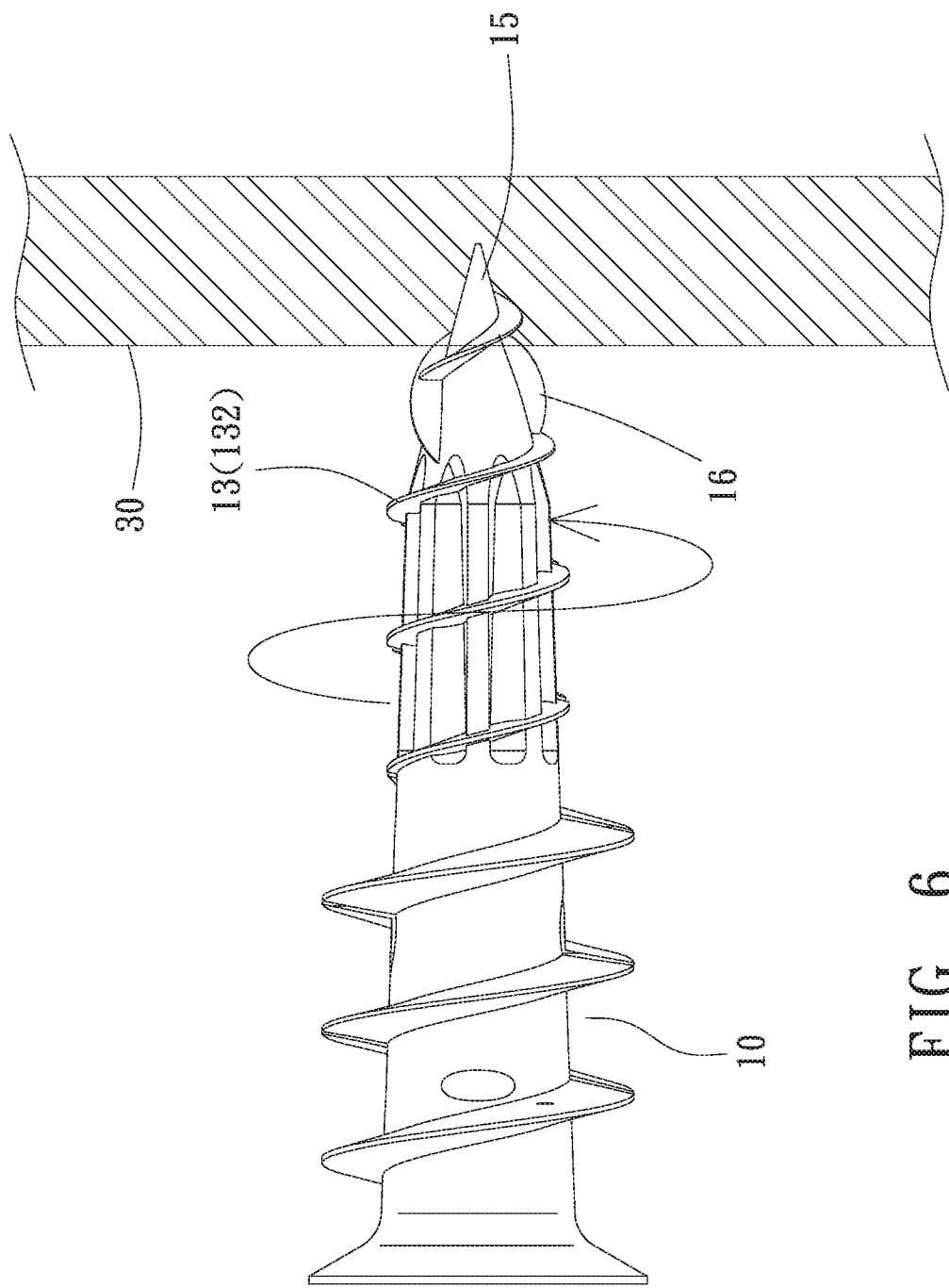
FIG. 6 is a cross-sectional view showing the operation of the expansion screw structure according to the preferred embodiment of the present invention.
Figure 7:
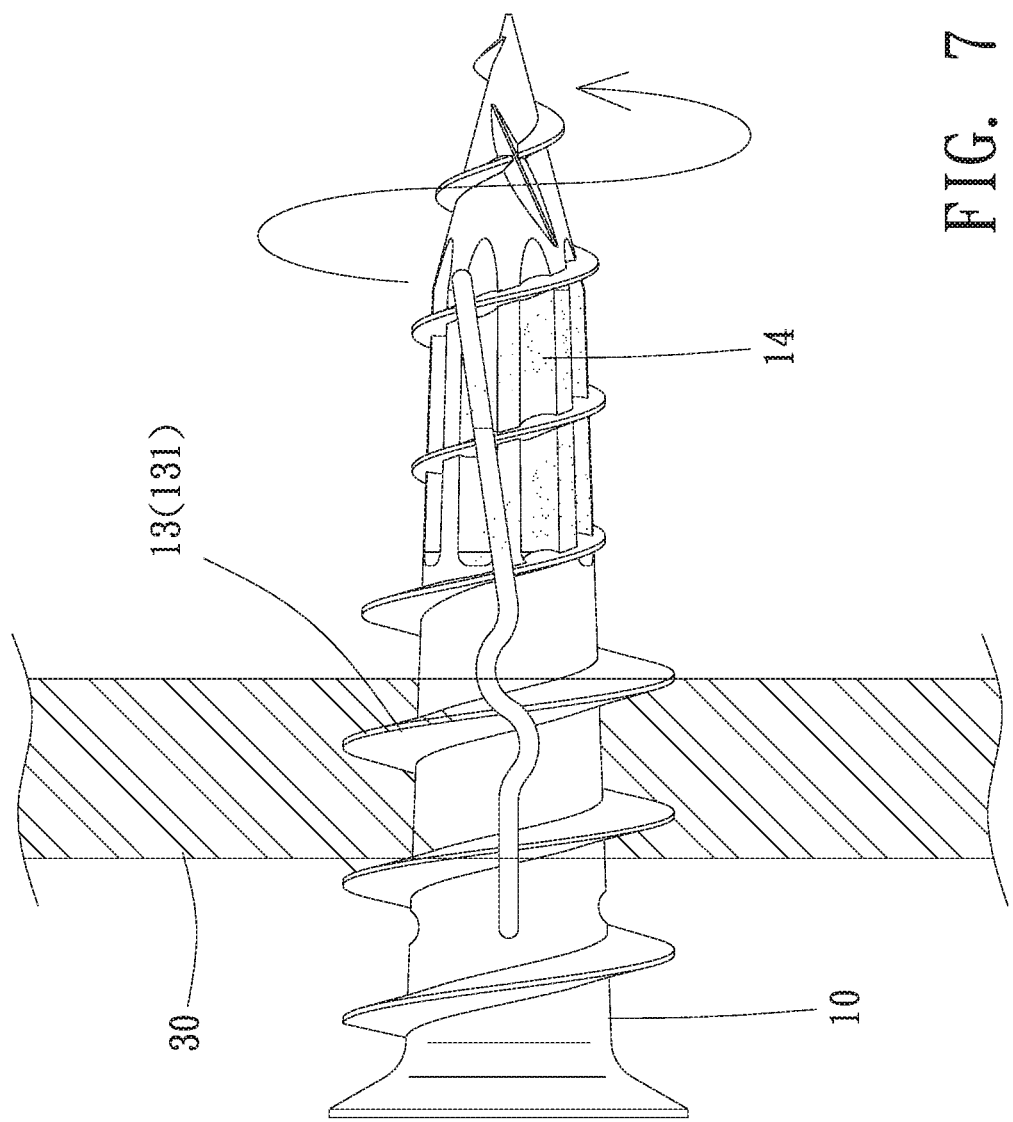
FIG. 7 is another cross-sectional view showing the operation of the expansion screw structure according to the preferred embodiment of the present invention.
Figure 8:
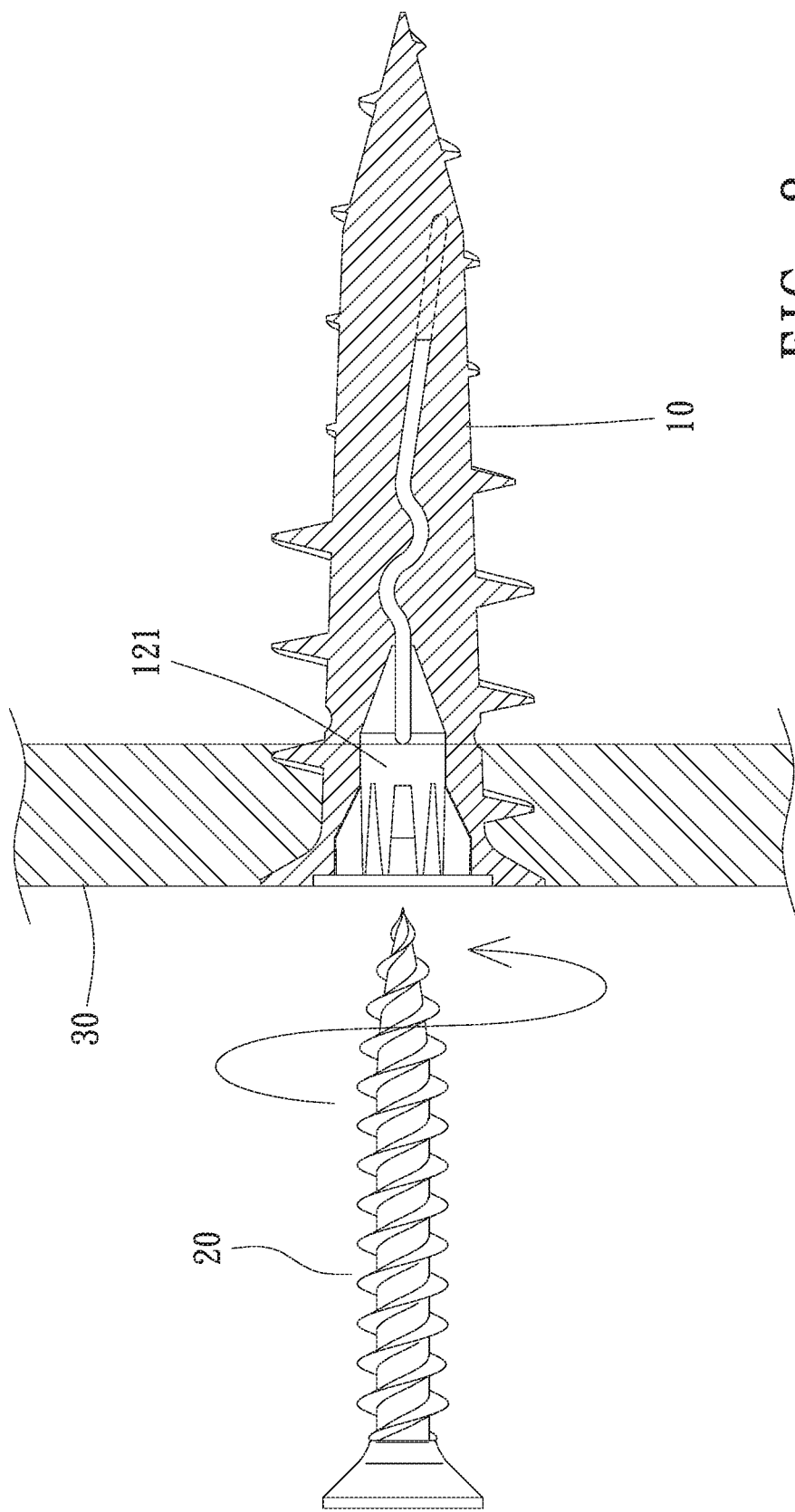
FIG. 8 is also another cross-sectional view showing the operation of the expansion screw structure according to the preferred embodiment of the present invention.

Referring to FIGS. 6-8, the anchor 10 is drilled into a hollow gypsum board 30 by rotating the decreasingly conical tip 15 quickly so that the multiple shallow threads 132 of the first threaded section 13 are drilled quickly, and the second threaded section 16 cuts excessive gypsum powders. Then, the second threaded section 16 presses the excessive gypsum powders inward to drill a hole completely. After drilling the hollow gypsum board 30, the second threaded section 16 does not work, and the multiple cutouts 14 cut more the gypsum powders and accommodate the gypsum powders, a drilled hole is flatten so that the multiple deep threads 131 of the first threaded section 13 are rotatably screwed until the shank 11 is completely moved into the hollow gypsum board 30, and the head 12 contacts with the hollow gypsum board 30. When the shank 11 is rotatably screwed, a reverse twisting force produces between the first support foot 18 and the second support foot 19, so it is difficult to support the reverse twisting force by using the connection section 176 only. To overcome this problem, the thin coupling strap 177 and the connection section 176 are applied to support and to enhance the reverse twisting force between the first support foot 18 and the second support foot 19 so that when the anchor 10 is rotatably screwed into the hollow gypsum board 30 completely, the first support foot 18 and the second support foot 19 do not separate, expand or break. When the first support foot 18 is separated from the second support foot 19 unexpectedly, the anchor 10 is not screwed into the hollow gypsum board 30.

Figure 9:
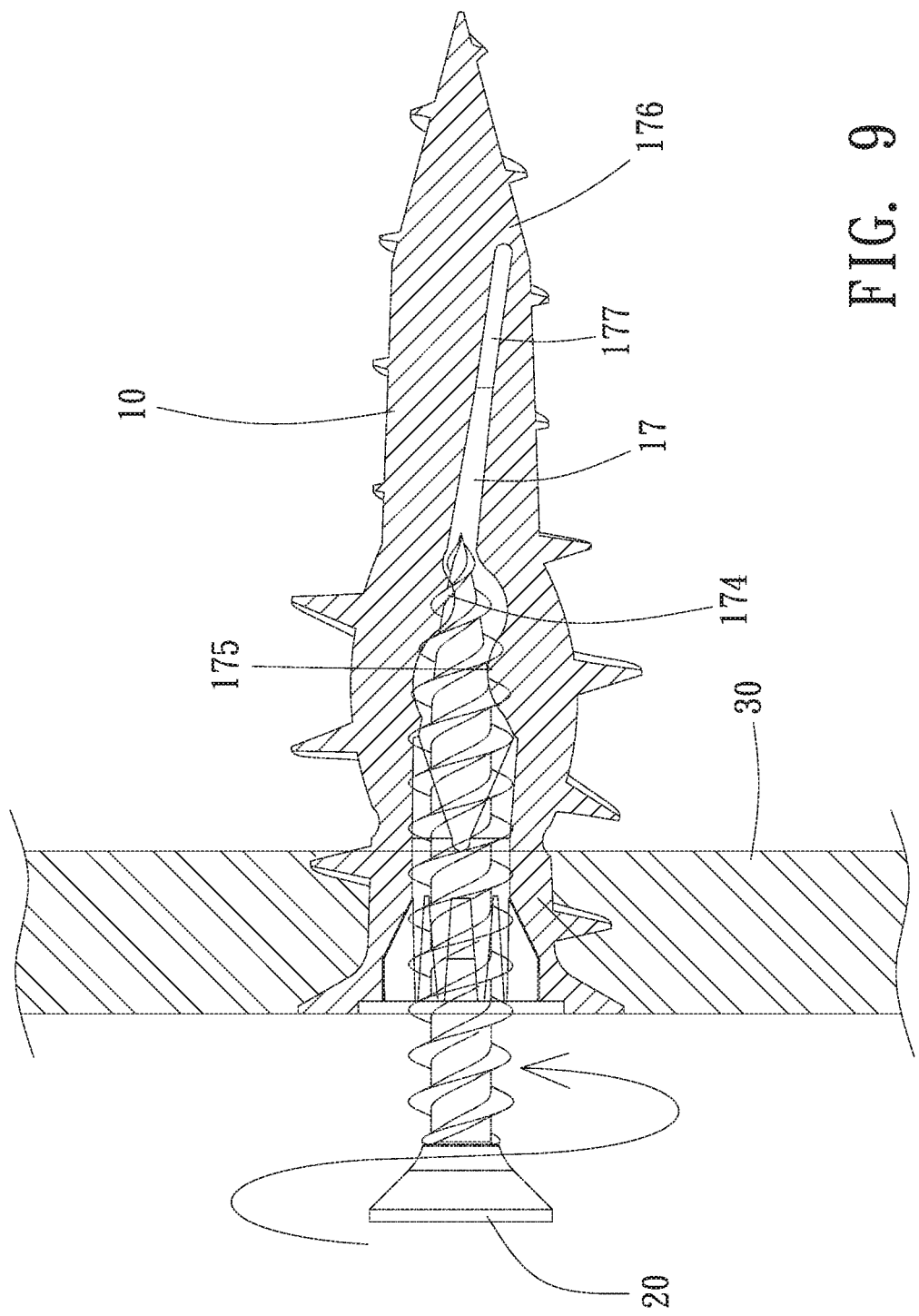
FIG. 9 is still another cross-sectional view showing the operation of the expansion screw structure according to the preferred embodiment of the present invention.
Figure 10:
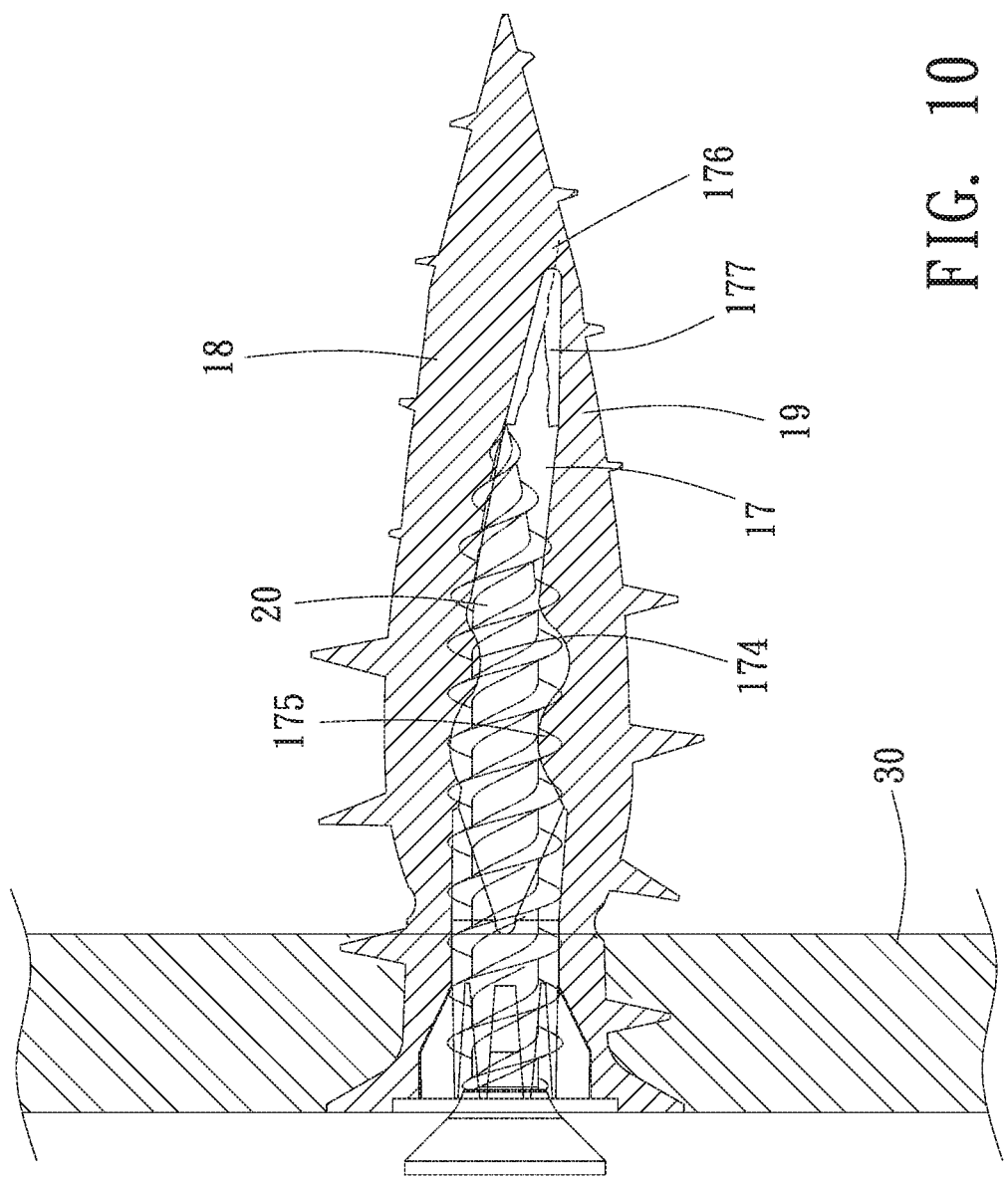
FIG. 10 is another cross-sectional view showing the operation of the expansion screw structure according to the preferred embodiment of the present invention.
Figure 11:
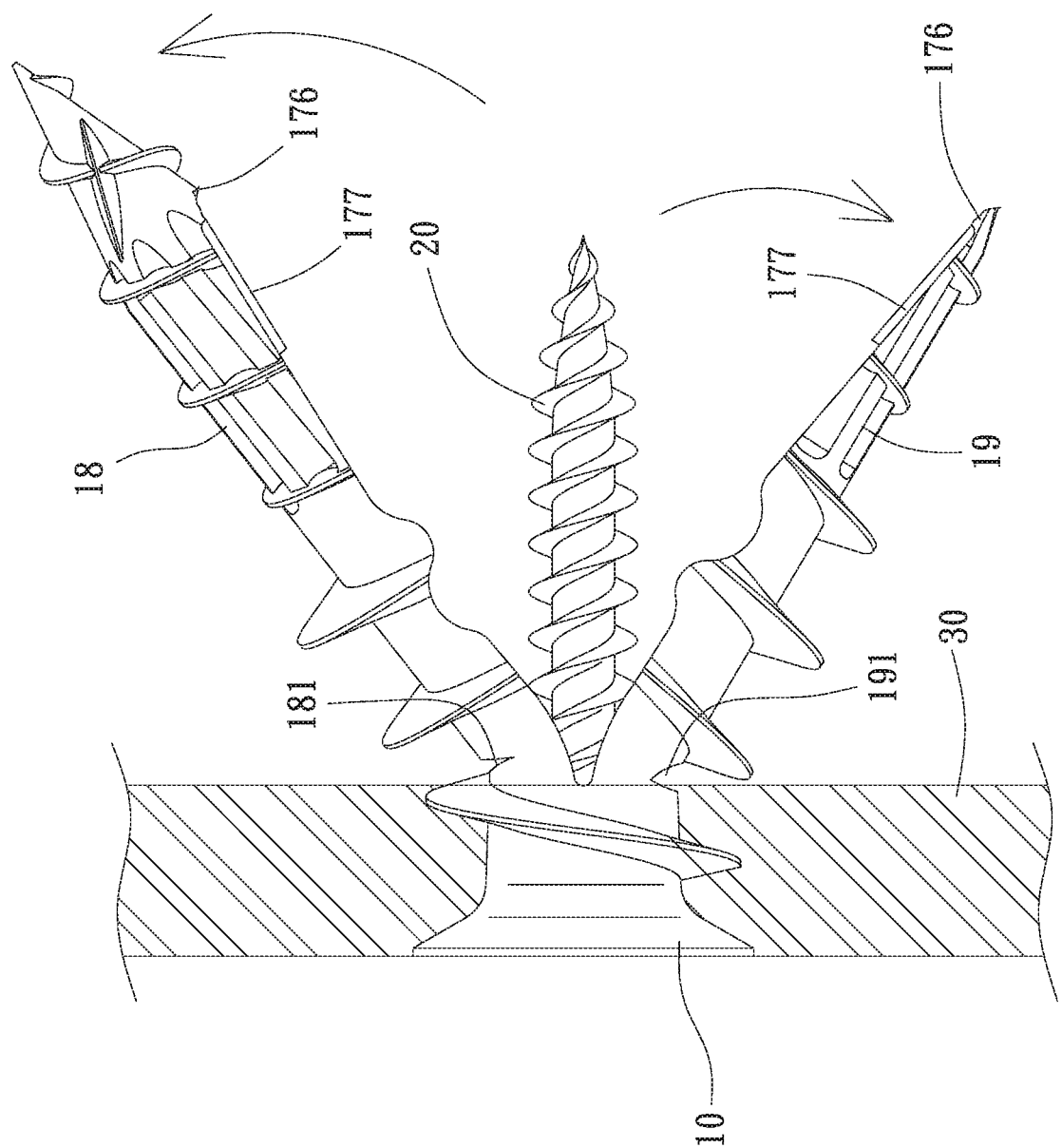
FIG. 11 is also another cross-sectional view showing the operation of the expansion screw structure according to the preferred embodiment of the present invention.
Figure 12:
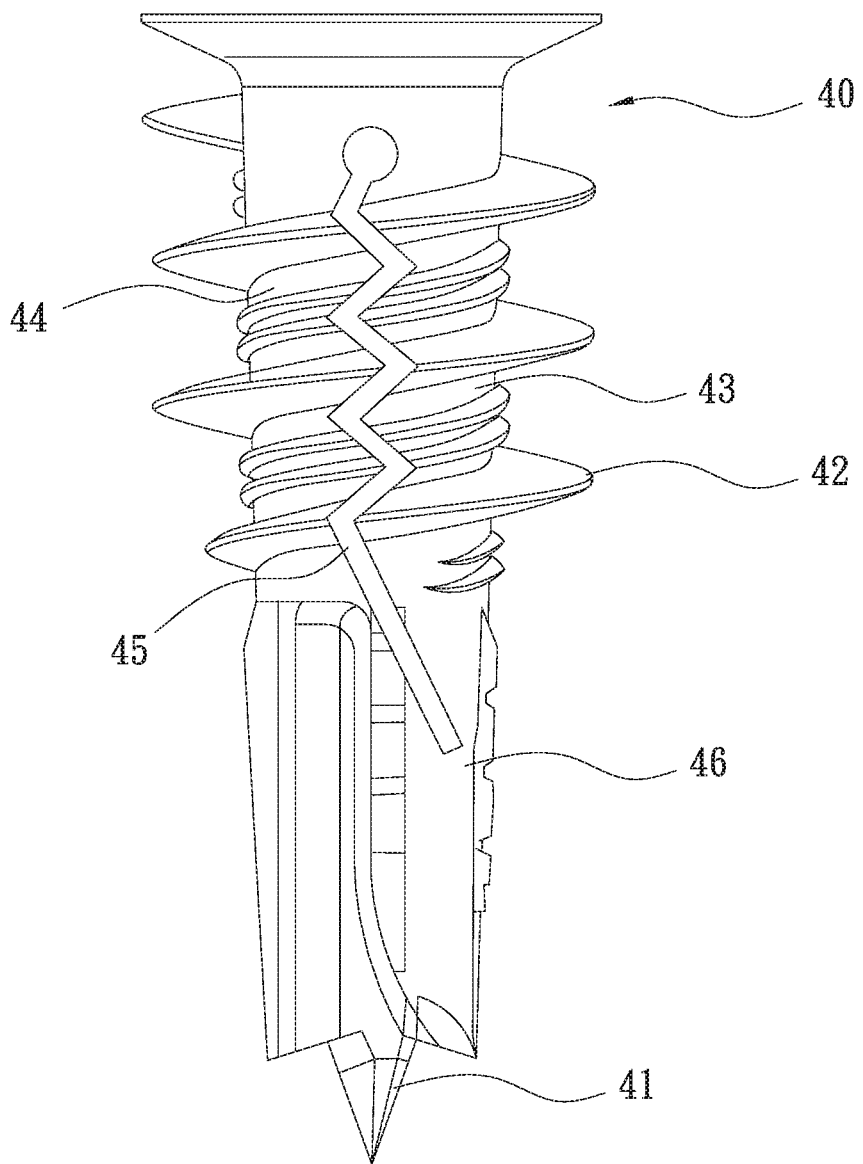
FIG. 12 is a front plan view of a conventional expansion mail.
Figure 13:
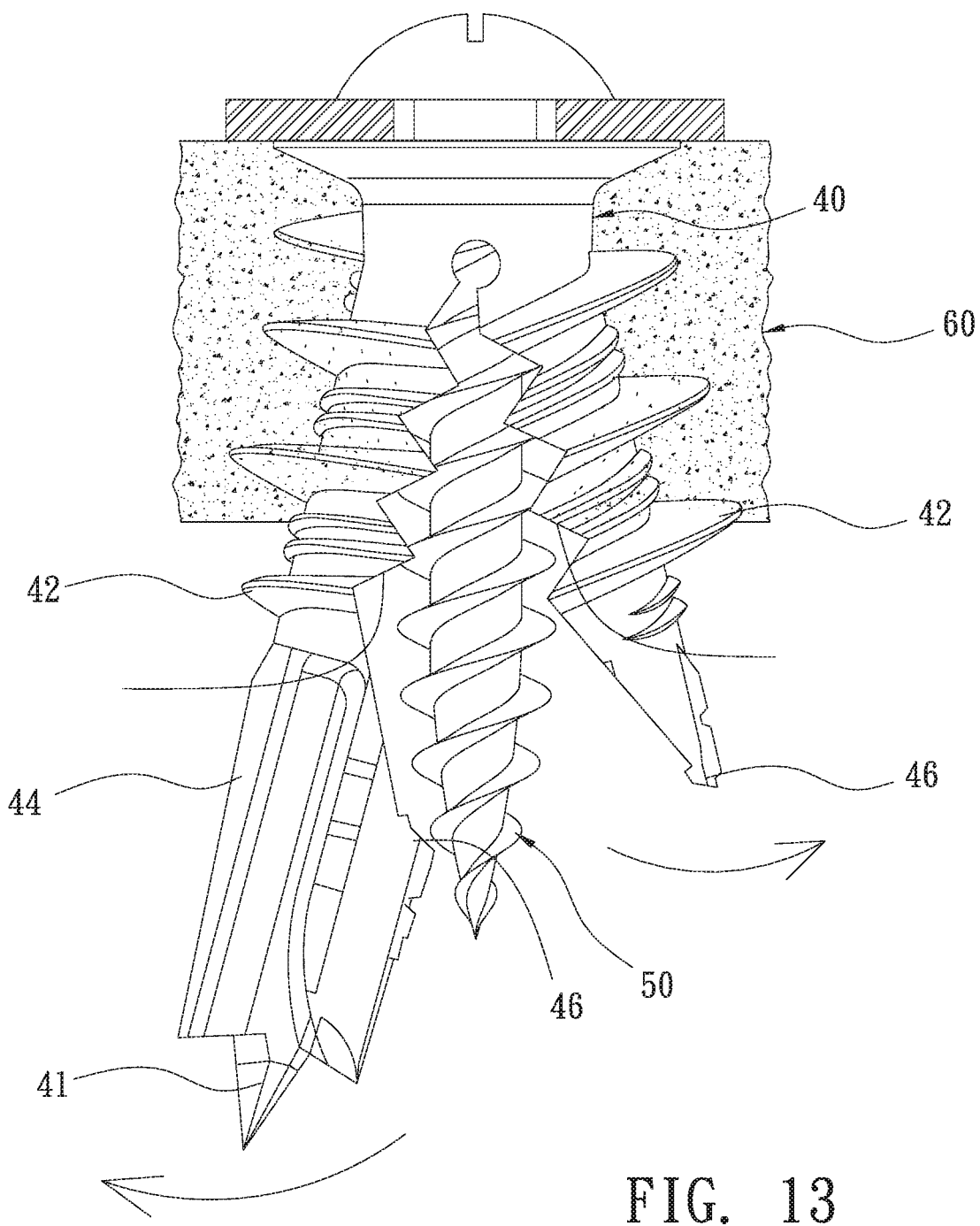
FIG. 13 is a cross-sectional view of the conventional expansion mail.

As shown in FIGS. 8-10, the screw 20 is screwed from the slot 121, it moves into the slit 17 along the slot 121, the screw 20 pushes the first raised portion 174 and the second raised portion 175 to expand the shank 11 so that the first support foot 18 is separated from the second support foot 19. When the shank 11 is expended to the thin coupling strap 177, and the shank 11 is expanded, a front end of the thin coupling strap 177 is torn until the thin coupling strap 177 and the connection section 176 are torn, as shown in FIG. 11. When the thin coupling strap 177 and the connection section 176 are broken fully, the first support foot 18 and the second support foot 19 are expanded outward by ways of the first curved groove 181 and the second curved groove 191 respectively.

Figure 5:
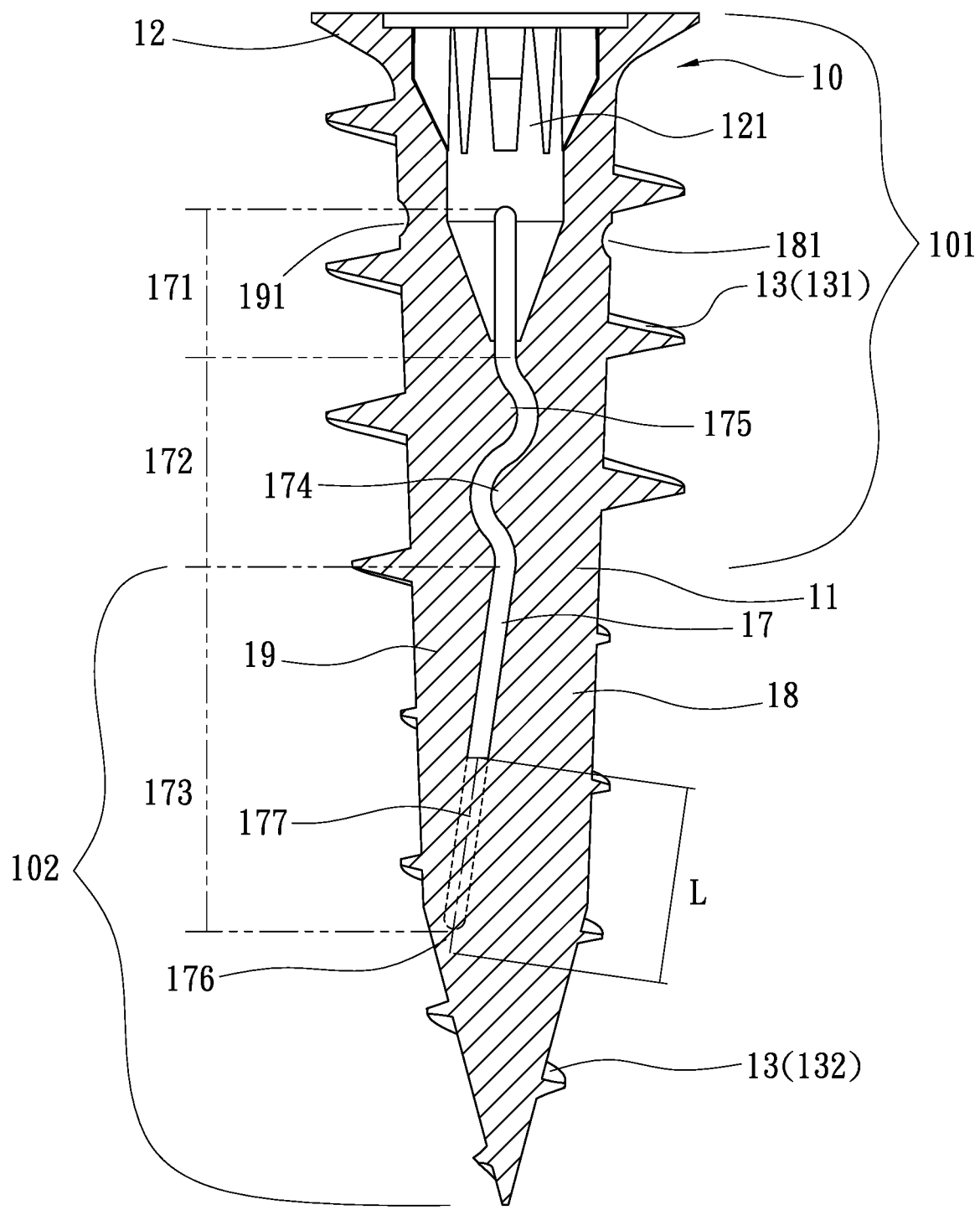
FIG. 5 is a cross-sectional view showing the assembly of the expansion screw structure according to the preferred embodiment of the present invention.

Thereby, when the anchor 10 is drilled into the hollow gypsum board 30, the reverse twisting force produces between the first support foot 18 and the second support foot 19, the connection section 176 is connected with the thin coupling strap 177 in a total length L so as to support the reverse twisting force, as shown in FIG. 5. When the reverse twisting force spreads in total length L, the anchor 10 is screwed into the hollow gypsum board 30, the first support foot 18 does not separate from the second support foot 19. When the screw 20 is screwed into the slot 121 from the anchor 10, the shank 11 expands to tear the front end of the thin coupling strap 177 in a thickness T and to tear the thin coupling strap 177 and the connection section 176, thus separating the thin coupling strap 177 from the connection section 176.

While various embodiments in accordance with the present invention have been shown and described, it is clear to those skilled in the art that further embodiments may be made without departing from the scope of the present invention.

What is claimed is:

1. An expansion screw structure comprising:
an anchor for mating with a screw;
wherein the anchor includes a first segment and a second segment opposite to the first segment, the first segment and the second segment have a central axis, and a shank extends from the first segment to the second segment,
wherein the anchor further includes a head formed on the shank at a top portion of the first segment, and a diameter of the head is more than a diameter of the shank, and the head has a slot defined in a top surface therein so as to accommodate a tool or the screw,
wherein the shank includes a first threaded section formed on an outer wall of the shank and extending from the first segment to the second segment, the first threaded section is in a positive thread type, and the shank includes multiple cutouts defined on the outer wall thereof adjacent to the second segment,
wherein the second segment of the shank has a decreasingly conical tip, the decreasingly conical tip has a second threaded section formed on an outer wall thereof,
wherein the shank includes a slit formed thereon and communicating with the slot so that the shank has a first support foot and a second support foot separated from the first support foot by the slit, the slit extends from a top of the shank to a bottom of the shank, and the slit has a first part, a second part, and a third part, wherein the first part is close to the first segment and passes through the central axis, the second part is connected with the first part and bends so that the second part has a first raised portion opposite to the first support foot, and the second part has a second raised portion opposite to the second support foot, the third part is connected with the second part and obliquely extends to the second support foot so that a length of the first support foot is not equal to the second support foot, the third part has a connection section arranged on a distal end thereof and configured to connect the first support foot and the second support foot, the third part has a thin coupling strap configured to connect the first support foot and the second support foot, wherein the thin coupling strap has a first thickness, the connection section has a second thickness, and the first thickness of the coupling strap is ⅓ of the second thickness of the connection section, the first thickness is not more than 3 mm.

2. The anchor as claimed in claim 1, wherein the first threaded section has multiple deep threads adjacent to the first segment, and the first threaded section has multiple shallow threads proximate to the second segment, wherein a depth of the multiple deep threads is more than the multiple shallow threads, and the multiple cutouts are located on a same zone as the multiple shallow threads.

3. The anchor as claimed in claim 1, wherein the second threaded section is in a reverse thread type and intersects with the multiple shallow threads of the first threaded section.

4. The anchor as claimed in claim 1, wherein the first support foot has a first curved groove formed on an outer wall thereof adjacent to the head, and the second support foot has a second curved groove formed on an outer wall thereof proximate to the head.

5. An expansion screw structure comprising: an anchor for mating with a screw;
wherein the anchor includes a first segment and a second segment opposite to the first segment, the first segment and the second segment have a central axis, and a shank extends from the first segment to the second segment, wherein the anchor further includes a head formed on the shank and the first segment, and a diameter of the head is more than a diameter of the shank and the head has a slot defined therein so as to accommodate a tool or the screw, wherein the shank includes a threaded section formed on an outer wall of the shank and extending from the first segment to the second segment, wherein the second segment of the shank has a decreasingly conical tip, wherein the shank includes a slit formed thereon and communicating with the slot so that the shank has a first support foot and a second support foot separated from the first support foot by the slit, the slit extends from a top of the shank to a bottom of the shank, and the slit has a first part, a second part, and a third part, wherein the first part is close to the first segment and passes through the central axis, the second part is connected with the first part and bends so that the second part has a first raised portion opposite to the first support foot, and the second part has a second raised portion opposite to the second support foot, the third part is connected with the second part and obliquely extends to the second support foot so that a length of the first support foot is not equal to the second support foot, the third part has a connection section arranged on a distal end thereof and configured to connect the first support foot and the second support foot, the third part has a thin coupling strap configured to connect the first support foot and the second support foot, wherein the thin coupling strap has a first thickness, the connection section has a second thickness, and the first thickness of the coupling strap is ⅓ of the second thickness of the connection section, the first thickness is not more than 3 mm.

6. The anchor as claimed in claim 5, wherein the shank includes multiple cutouts defined on the outer wall thereof adjacent to the second segment, and wherein the decreasingly conical tip has a threaded section formed on an outer wall thereof.

7. The anchor as claimed in claim 5, wherein the threaded section has a first threaded section and a second threaded section, the first threaded section has multiple deep threads adjacent to the first segment, and the second threaded section has multiple shallow threads proximate to the second segment, wherein a depth of the multiple deep threads is more than a depth of the multiple shallow threads.

8. The anchor as claimed in claim 7, wherein the second threaded section is in a reverse thread type.

9. The anchor as claimed in claim 5, wherein the first support foot has a first curved groove formed on an outer wall thereof adjacent to the head, and the second support foot has a second curved groove formed on an outer wall thereof proximate to the head.

10. The anchor as claimed in claim 5, wherein a first thickness is within 0.4 mm to 1.2 mm.

* * * * *